(12) United States Patent
Tamboly et al.

(10) Patent No.: US 9,171,143 B2
(45) Date of Patent: Oct. 27, 2015

(54) SYSTEM FOR AND METHOD OF GENERATING VISUAL PASSWORDS

(71) Applicants: Verizon Patent and Licensing Inc., Basking Ridge, NJ (US); Cellco Partnership, Basking Ridge, NJ (US)

(72) Inventors: Niloufer Tamboly, Edison, NJ (US); Denise Kearney Whittaker, Neptune, NJ (US); Renato J. Delatorre, Palisades Park, NJ (US); Aneeta F. Arestani, Edison, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/134,574

(22) Filed: Dec. 19, 2013

(65) Prior Publication Data

US 2015/0178490 A1    Jun. 25, 2015

(51) Int. Cl.
*G06F 7/04* (2006.01)
*G06F 15/16* (2006.01)
*G06F 17/30* (2006.01)
*H04L 29/06* (2006.01)
*G06F 21/36* (2013.01)
*G06F 21/46* (2013.01)

(52) U.S. Cl.
CPC ............ *G06F 21/36* (2013.01); *G06F 21/46* (2013.01)

(58) Field of Classification Search
CPC ................... G06F 21/46; G06F 21/36
USPC ............................................................. 726/4
See application file for complete search history.

(56) References Cited

U.S. PATENT DOCUMENTS

| | | | |
|---|---|---|---|
| 8,392,975 B1* | 3/2013 | Raghunath | 726/7 |
| 8,650,636 B2* | 2/2014 | Johnson et al. | 726/19 |
| 8,655,027 B1* | 2/2014 | Olthoff | 382/118 |
| 2004/0030934 A1* | 2/2004 | Mizoguchi et al. | 713/202 |
| 2005/0060554 A1* | 3/2005 | O'Donoghue | 713/183 |
| 2008/0209526 A1* | 8/2008 | Varghese et al. | 726/5 |
| 2012/0023574 A1* | 1/2012 | Osborn et al. | 726/19 |
| 2012/0291108 A1* | 11/2012 | Talamo et al. | 726/6 |
| 2013/0036461 A1* | 2/2013 | Lowry | 726/19 |
| 2013/0167225 A1* | 6/2013 | Sanft et al. | 726/19 |
| 2013/0318587 A1* | 11/2013 | Shamsspoor | 726/7 |

OTHER PUBLICATIONS

Xiaoyuan Suo; Graphical Passwords: A Survey; 2005 IEEE; p. 1-10.*

* cited by examiner

*Primary Examiner* — Monjour Rahim

(57) ABSTRACT

Systems and methods for creating a visual password are presented. A user having an account or profile is given the option to create a visual password via a graphical user interface. The interface displays a plurality of themes to the user, wherein each theme represents a category of images. The user selects a theme and is presented with a plurality of images within the category. The user selects one or more images in a certain order to create a visual password. The selected images and order of selection are saved as the user's visual password. When the user later attempts to electronically access his account, the user will be required to select the correct pictures in the correct sequence in order to access his account.

18 Claims, 6 Drawing Sheets

SYSTEM FOR AND METHOD OF GENERATING VISUAL PASSWORDS

BACKGROUND INFORMATION

Currently, in order to electronically access a secure account, a user must enter a text-based password. The password is typically some combination of letters, numbers, and symbols. The user must remember this combination and keep it secure from others. Furthermore, many password-based systems require the user to update or change his or her password periodically, requiring the user to learn a new password. Text-based passwords may be difficult to create or translate across different languages and cultures.

These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
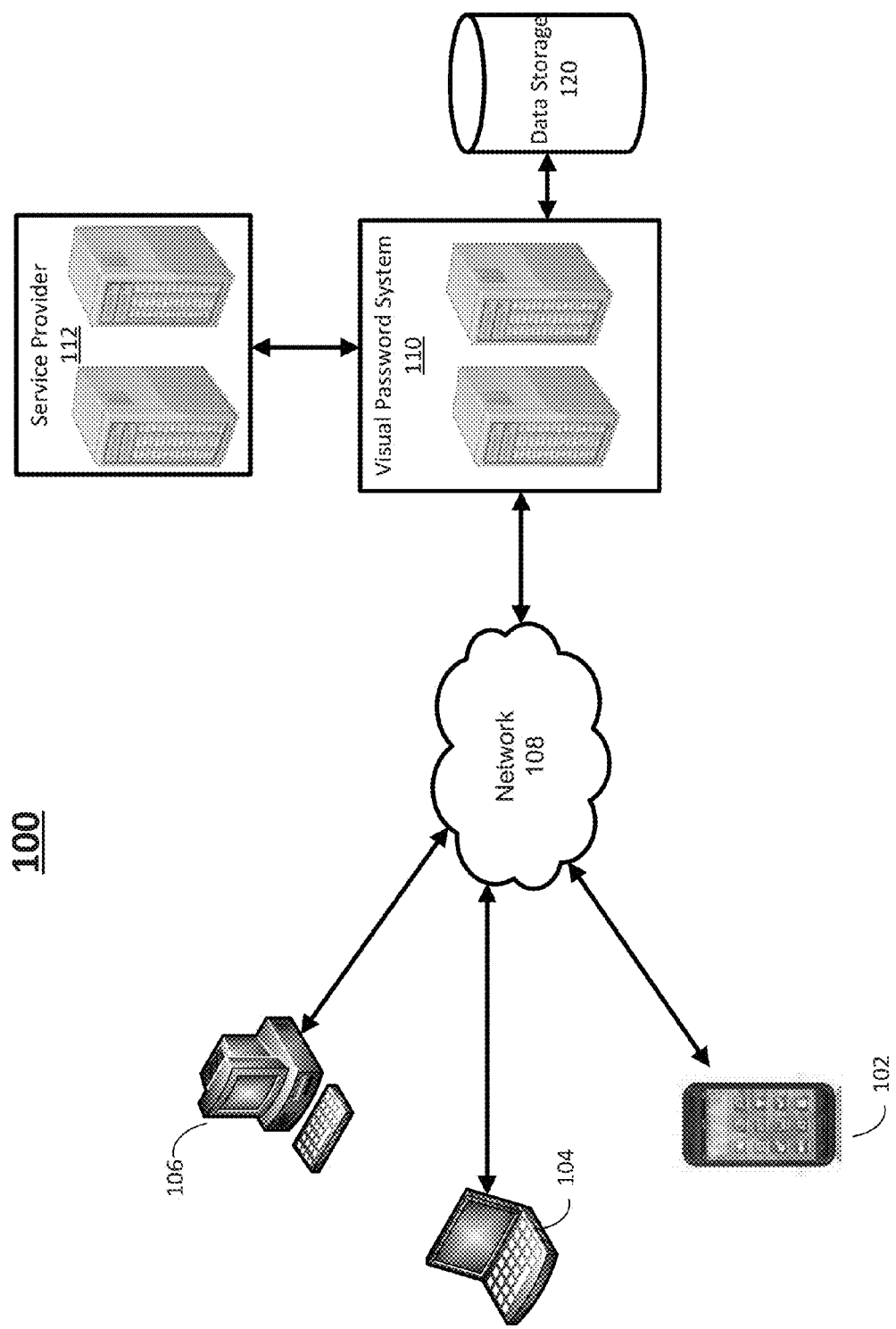
FIG. 1 is a schematic diagram illustrating a system according to a particular embodiment.

A system and method may include various embodiments for generating and employing visual passwords. A user device may access a login screen for an account (such as an account that the user has with a wireless service provider). The screen may provide an interactive password creation option for users wishing to access their account. The user may be prompted to select a visual theme from a range of options. The theme may be displayed as a graphical image or picture. Once the user selects a certain theme, the user may be presented with a series of visuals based on the selected theme. The visuals may also be graphical images or pictures. The user is prompted to select a certain number of images to create their password.

Each image has an assigned value, where the assigned value may be a unique series of alphanumeric characters and/or symbols. The visual password system may create a password string comprising the characters associated with each selected image (in the order the images were selected). The images selected by the user (and the associated characters) and the order of selection are then stored as the user password. The saved password may be associated with the user's profile or account.

When a user later attempts to login to his or her account in order to access services from the service provider, the user may be prompted to first enter a username. Upon entering the username, the system may present the user with a collection of images (such as in the form of a grid), where the collection of images includes each of the images from the user's password. In order to proceed, the user may be required to select the correct images in the correct order. If the user selects the correct images in the correct order, the user will be granted access to his or her account. A user who selects the wrong images, or selects the correct images in the wrong order, may be given a limited number of attempts to re-enter the correct images in the correct sequence before being locked out of the system for a period of time.

Using a visual representation or image to register a password helps in making the password language, age and literacy neutral. A user can speak any language and still be able to recognize a visual representation. Unlike a text-based password, the age and literacy level of the user does not restrict a user from using a Visual Password. In a country like India where a sizeable portion of the population may be illiterate and where over 38 different languages are spoken, this type of password scheme may be helpful in a number of contexts in which passwords are typically employed, such as banking, etc.

The description below describes theme modules, image modules, password conversion modules, authentication modules, user devices, service providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

FIG. 1 is a schematic diagram illustrating a system according to a particular embodiment. A system 100 may include user devices 102, 104, and 106, a network 108, service provider 112, data storage 120, and visual password system 110. Although elements of system 100 may be described as a single device, it will be appreciated that multiple instances of these devices may be included in system 100, such as, for example, multiple user devices, multiple visual password systems, multiple service providers, multiple data storages, and multiple networks. A user may be associated with user device 102, a second user may be associated with user device 104, and a third user may be associated with user device 106. In other embodiments, the same user may be associated with multiple user devices.

User devices 102, 104, and 106 may each be, for example, but not limited to, a cellular telephone, Session Initiation Protocol ("SIP") phone, software client/phone, a desktop computer. a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user devices 102, 104, and 106 may include one or more transmitters, receivers, and/or transceivers to transmit and/or receive one or more signals to and/or from other components depicted in FIG. 1, including, for example, visual password system 110, and service provider 112.

Network 108 may be a wireless network, a wired network, or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. Also, network 108 may support, an Internet network, a wireless communication network, a cellular network, or the like, or any combination thereof. Networks 108 may further include one, or any number of the exemplary types of networks mentioned above operating as a stand-alone network or in cooperation with each other. Network 108 may utilize one or more protocols of one or more network elements to which it is communicatively coupled. Networks 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

Data storage 120 may be network accessible storage and may be local, remote, or a combination thereof to the components depicted in FIG. 1. Data storage 120 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 120 may be a database, such as an Oracle database, a Microsoft SQL Server database, a DB2 database, a MySQL database, a Sybase database, an object oriented database, a hierarchical database, or other database. Data storage 120 may utilize flat file structures for storage of data. Data storage 120 may be communicatively coupled to visual password system 110, or to any other component depicted in FIG. 1. Any of the other components depicted in FIG. 1 may include one or more data storages as well.

Visual password system 110 may include one or more devices, modules, and/or components for providing routing information for transmitting data over a network, such as, for example, an IP network and/or a PSTN. For example, visual password system 110 may be part of, or communicatively coupled to, service provider 112, and may receive a request from a user device to remotely access one or more services provided by service provider 112. Visual password system 110 may include one or more computer systems and/or processors to provide visual password creation and authentication services. Visual password system 110 may include a theme module, an image module, a password conversion module, an authentication module, and a password update module as described herein in reference to FIG. 2. Also, in various embodiments, visual password system 110 may be a resolution server or may be a module of, or communicatively coupled to, a Domain Name System ("DNS") server, such as a BIND server, for converting host names and domain names into IP addresses over the Internet. Visual password system 110 may comprise one or more network enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. In other embodiments, visual password system 110 may be implemented as part of a software application on a user device. For example, visual password system 110 may be implemented as a mobile application on user device 102.

Figure 2:
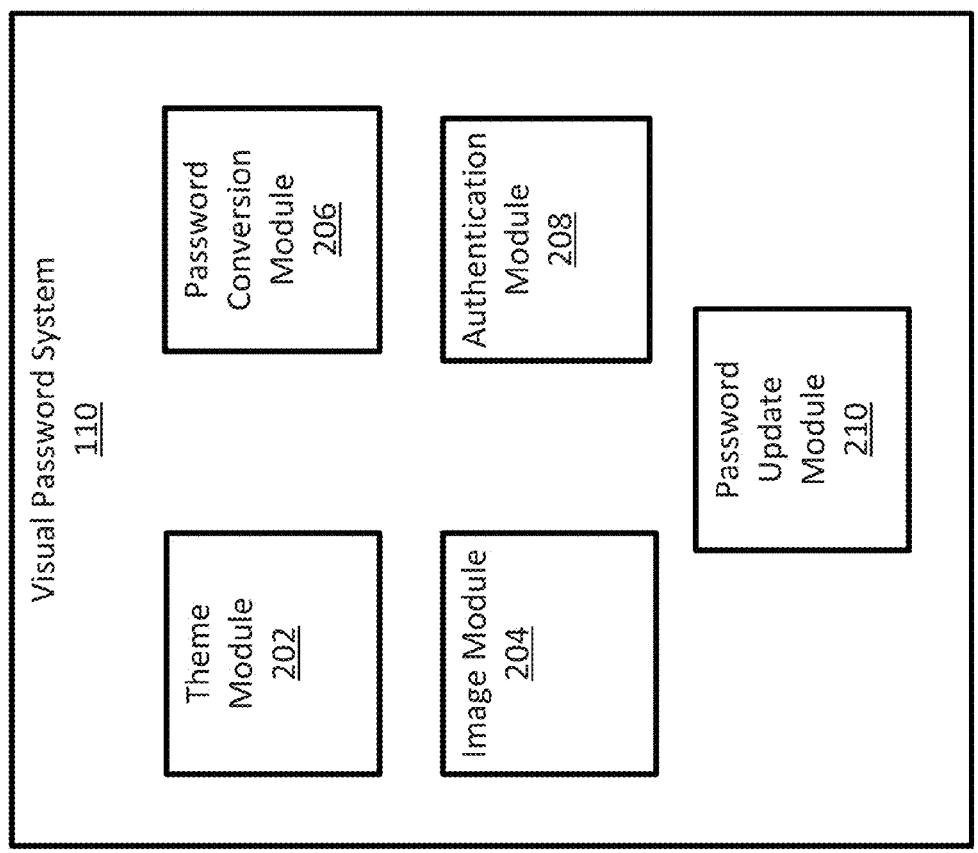
FIG. 2 is a schematic diagram of a hardware component of the system of a particular embodiment.

FIG. 2 is a block diagram of a hardware component of an exemplary embodiment of visual password system 110. For example, visual password system 110 may include a theme module 202, an image module 204, a password conversion module 206, an authentication module 208, and a password update module 210. It is noted that modules 202, 204, 206, 208, and 210, are exemplary and the functions performed by one or more of the modules may be combined with that performed by other modules. The functions described herein as being performed by modules 202, 204, 206, 208, and 210 may also be separated and may be performed by other modules at devices local or remote to visual password system 110. The modules may each be a computer program or an appropriately programmed computer, such as a mainframe or personal computer, or may include a plurality of such computers cooperating to perform the functionality described herein. Modules 202, 204, 206, 208, and 210 may also communicate with data storage 120. Modules 202, 204, 206, 208, and 210 may also be coupled to or integrated with visual password system 110 or service provider 112. For example, modules 202, 204, 206, 208, and 210 may be external devices that are wirelessly coupled and/or communicatively coupled to visual password system 110 via an interface port which may include, without limitation, USB ports, system bus ports, or Firewire ports and other interface ports. Further, computer code may be installed on visual password system 110 to control and/or operate a function of theme module 202, image module 204, password conversion module 206, authentication module 208, and/or password update module 210.

Service provider 112 may comprise one or more network enabled computers. Service provider 112 may be, for example, a telecommunications service provider, a financial institution (such as a bank or credit card provider), a social networking site, or an internet service provider. A user associated with user device 102 may have an account and/or profile with service provider 112. User device 102 may remotely access the user's account using a browser-based web interface, or using a local application running on user device 102. The local application may be a combination of hardware and/or software that allows the user to access his account with service provider 112 via network 108 and visual password system 110. The user devices may be configured to execute one or more applications to, for example, receive data as input from an entity accessing the user device, process received data, transmit data over a network, and receive data over a network. The one or more applications for creating a visual password may be integrated into a broader application that gives a user access to a plurality of services associated with his or her account with service provider 112. The one or more applications may be the same application that a user would use to access her account by providing a text-based password.

Before allowing a user to access confidential account information, the service provider 112 may require the user to enter a username and/or a password. In prior art systems, the password may comprise a series of alphanumeric characters and symbols, known only to the user and the service provider. Each time a user wishes to access his account with a service provider, the user may be required to enter his username and password at a login page or screen before being given access to his account information.

A user's account information may be stored in database 120. Account information may include username, password, visual password, contact information, phone number(s), email addresses, and other information that personally identifies the user as the account holder. When a user attempts to remotely access his or her account or profile with service provider 112, the user's account information may be retrieved from database 120 and compared to the login information provided by the user.

As depicted in FIGS. 1 and 2, visual password system 110 allows a user to create and save a visual password that the user can use to access one or more accounts or profiles at service provider 112. Visual passwords may be used to securely access other types of information where a user is required to input his or her credentials before being granted access to the information (e.g., a private network).

A user associated with user device 102, 104, or 106 may first create a visual password using a web interface (connected via network 108) provided by visual password system 110 and/or a local application stored on user device 102, 104, or 106 and connected to visual password system 110 via network 108. The user may have previously created an account with service provider 112. The user may have a username and text-based password associated with the account, along with other account information that may be stored in data storage 120. When the user accesses the login screen for the account, the user may be presented with a "create visual password" option.

Figures 3A, 3B:
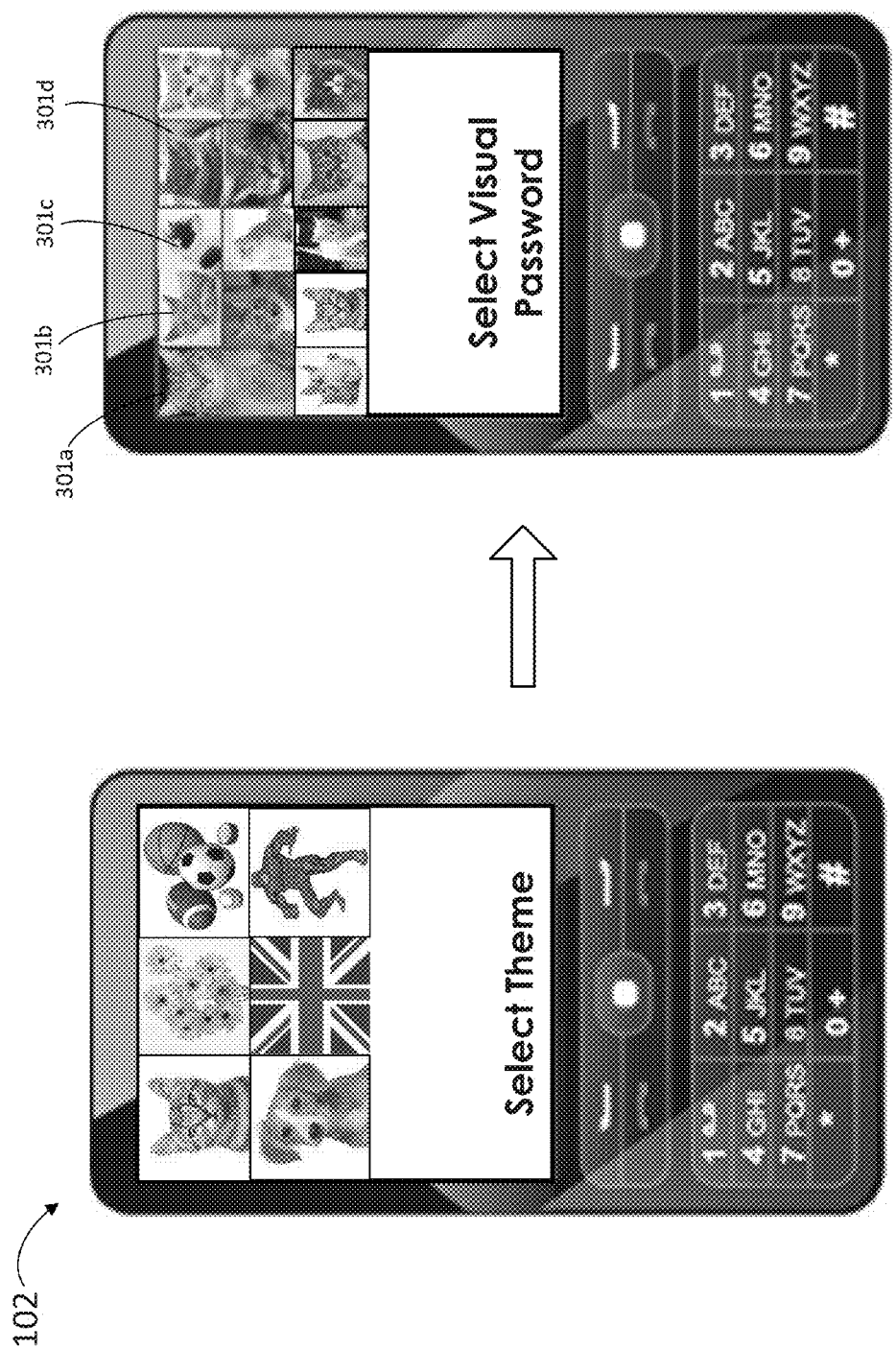
FIGS. 3a and 3b are screenshots of a user interface of a particular embodiment.

If a user selects the "create visual password" option (e.g., by clicking on it or touching it using a touchscreen on user device 102, 104, or 106), theme module 202 may present the user with one or more "themes." As used herein, a theme may be a visual representation of a category of images. Theme categories may include, for example, "Nature," "Celebrities," "Countries," "Dogs," "Cats," "Superheroes," "Flags," "Sports Teams," "Athletes," "Movies," etc. Each theme may be represented by an image, as shown in FIG. 3a, which depicts a screenshot of an exemplary embodiment of part of the "create visual password" option as it would be presented on the screen of user device 102. Themes and images may be at least one of a JPEG, TIFF, GIF, BMP, PNG, RAW, WEBP, a PAM file, or other known formats for embodying digital images.

As seen in FIG. 3a, six themes are displayed in the form of six images: "Cats," "Flowers," "Sports," "Dogs," "Flags," and "Superheroes." In other embodiments, each theme may include a textual label that identifies the theme. Other embodiments may display more or fewer themes, or multiple pages of themes that a user can scroll through. The themes presented by theme module 202 may depend on the account information associated with the user (such as age, sex, location, interests, etc. . . . ). The themes presented may depend on user information gathered from other sources (e.g., marketing, surveys, the user's social networking accounts). In this way, theme module 202 may select themes that are more likely to appeal to that user. For example, if the user is a teenager (between the ages of 13-18), theme module 202 may present themes such as "Video Game Characters," "Celebrities," and "Music Groups". The themes may be country or region specific, based on where the user lives or the current location of the user device. Theme module 202 may present seasonal themes based on the current date and/or time (e.g., holiday-related themes in December, patriotic themes in July if the user lives in the United States). Images presented to the user by image module 204 may depend on similar factors as the themes presented by theme module 202.

Themes may be stored in data storage 120. Theme module 202 may retrieve themes from data storage 120. Theme module 202 may periodically update the themes stored in data storage 120 and/or add additional themes and/or remove themes. Seasonal and/or holiday-related themes may be added or removed to data storage 120 depending on the time of year.

The themes may be presented as a grid, as shown in FIG. 3a. The themes may be presented as a scroll wheel, allowing the user to scroll through a series of themes. The user may be prompted to select a theme using a key on a keypad of user device 102 (e.g., depress a key, scroll a wheel, etc.), clicking on the image displayed on the screen using a mouse or other peripheral device connected to user device 102, pressing a button on the side of user device 102, by touching a theme on a touchscreen of user device 102, by speaking a selection, by use a motion (e.g., the user device may include a gyroscope or other motion detector to detect when the user moves the device a certain angle, or shakes, swings, maneuvers, and/or otherwise moves the calling device, etc.), or other manners of selecting between the different themes.

Once a user selects a theme, image module 204 may present the user with one or more images associated with the selected theme. Each theme may be associated with one or more images that show members of the category represented by the theme. For example, if the user selected the theme "Flags," image module 204 would present the user with one or more images, where each image displayed a different flag. FIG. 3b shows a screenshot of an exemplary embodiment of one step in the "create visual password" feature. The screenshot in FIG. 3b may be what is provided by image module 204 if the user had selected the "Cat" theme from FIG. 3a.

Images may be stored in data storage 120. Image module 204 may retrieve images from data storage 120. Image module 204 may periodically update the images stored in data storage 120 and/or add additional images and/or remove images. Seasonal and/or holiday-related images may be added to and/or removed from data storage 120. Image module 204 may create new images and associate them a theme based on the theme. For example, if the theme is "NFL Players," additional images representing new rookie players may associated with that theme each year following the NFL draft. If the theme is "Movies," additional images may be associated with that theme at periodic intervals as new movies are released to the public. The rate at which new images are associated with a theme and added to data storage 120 (or removed and no longer associated with a theme) may vary based on the themes, or may be the same for all themes. Image module 204 may delete or remove images that no longer need to be associated with a theme.

Images and themes may have been preloaded into visual password system 110 and/or stored in data storage 120 prior to the user accessing the system. In other embodiments, a user may create themes and images associated with that theme. A user may upload the created themes and/or images to theme module 202 and/or image module 204 using the user interface. In other embodiments, a user may upload new images and associate them with pre-existing themes. For example, the user interface on the user device (provided by the one or more applications or the web site) may include a "Custom Theme" and/or "Custom Image" option(s). A user may be able to select one or more images (such as digital photos taken by the user and stored on user device 102) and upload them to be stored as part of the user's visual password (in addition to or instead of selecting images presented by image module 204). The user may allow image module 204 and/or theme module 202 to provide the images to database 120 for storage and later use by other users.

As shown in FIG. 3b, the user is prompted to select a visual password. Images may be presented to the user as a grid of images, a scroll wheel of images, multiple pages of images, or in other formats. The user may select one or more images using the same functionality used to select the theme. The user may select one or more images using a different functionality than the one used to select the theme (e.g., drag and drop). In one exemplary embodiment, the user may be prompted to select a series of four images that will comprise the user's visual password. The prompt may be in the form of a text-based instruction. The prompt may include a number of empty boxes displayed below the images and the user may be instructed to drag and drop images into the empty boxes. When the user selects an image, the user interface may highlight the image or place a number next to the image indicating the order in which the image was selected.

Theme module 202 and image module 204 may be configured to allow the user to navigate between multiple themes and select one or more images from a plurality of themes to create a visual password. For example, a user may select two images from a "Flags" theme, and three images from a "Flowers" theme. The images may be selected in any order (e.g., the user may first select an image from the "Flags" theme, then two images from the "Flowers" theme, then a second image from the "Flags" theme).

When the user has selected the required number of images, password conversion module 206 may save the images and the order in which they were selected by the user in database 120. The saved images may be associated with the user's profile and/or account information. Each image may be assigned a unique series of alphanumeric characters and/or symbols by password conversion module 206. In other embodiments, each image may have been previously associated with a unique series of alphanumeric characters and symbols, by theme module 202 or image module 204, or by service provider 112. Password conversion module 206 may save the series of alphanumeric characters and symbols associated with each selected image in the order in which they were selected and associate this password string with the user's profile in data storage 120.

Figure 4A:
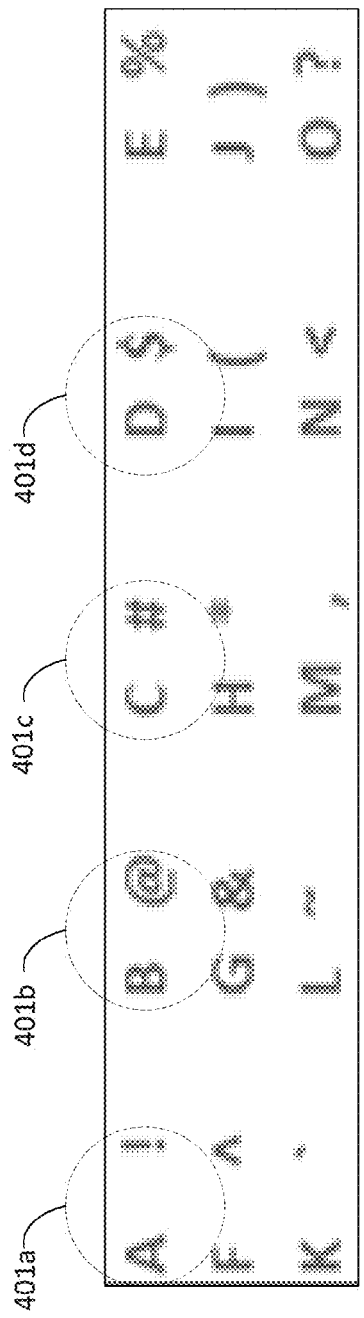
FIGS. 4a and 4b are diagrams of password conversion strings of a particular embodiment.

In one embodiment, a grid of images in data storage 120 (such as the one depicted in FIG. 3b) may be associated with a grid of characters and/or symbols. FIG. 4a depicts a diagram of a grid of unique alphanumeric characters and symbols that are associated with the grid of images in FIG. 3b, according to an exemplary embodiment. For example, image 301a may be associated with the unique series of alphanumeric characters and symbols shown in 401a—"A!" Image 301b may be associated with the characters and symbols represented by 401b—"B@". In one embodiment, if the user selected images 301a, 301c, 301d, and 301b as his visual password (in that order), password conversion module 206 would construct the password string "A!C#D$B@" based on the grid in FIG. 4a, and save it with the user's profile or account information in data storage 120. The grid shown in FIG. 4a may have been previously associated with the images in FIG. 3b by image module 204, theme module 202, password module 206, and/or service provider 112.

Figure 4B:
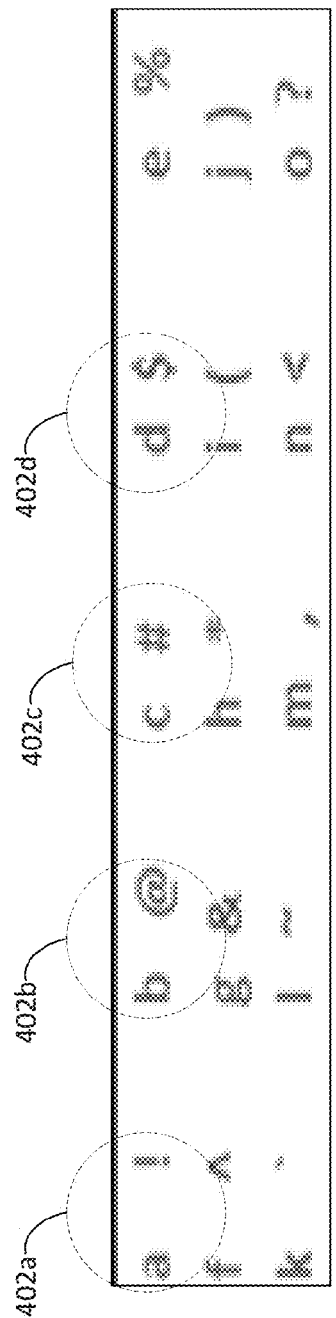

In another embodiment, password conversion module 206 may "switch" to a different grid after the user selects the first image for his or her visual password, such as the one shown in FIG. 4b. For example, assume a user selects image 301d as the first image in her visual password during the "create visual password" process. The first set of characters in her password string would be those shown in 401d—"D$". After the first image is selected, password conversion module 206 would then switch to the grid shown in FIG. 4b. Thus, if the user then selects images 301c, 301b, and 301a, the password conversion module 206 would save the password string of "D$c#b@a!" The grid may be switched again (either to a new grid or back to the original grid) each time the user selects another image. The grid may be switched after the user has selected a predetermined number of images.

In other embodiments, the password conversion module 206 may save the selected images and order in database 120, associate the selected images and the order of the selected images with the user profile information, then determine the associated password string and save the associated password string in data storage 120 with the user profile information. The user may select the same image multiple times as part of the visual password.

Password conversion module 206 may add an additional string of randomly generated numbers to the password string. The additional string may comprise three randomly generated numbers. Password conversion module 206 may insert the additional string of characters at any point in the password string. Password conversion module 206 may add multiple additional strings at various points within the password string. The placement of the additional string within (or appended to) the password string may depend on the length of the password string, and/or user information. Password module 206 may encrypt the password string that is saved with the user profile.

Authentication module 208 may be configured to authenticate a user who attempts to access his profile or account using a visual password. A user may first access a login screen, such as on a local application on the user device 102, or on a webpage provided by service provider 112 (the local application may be the same application used to create the visual password). The user may be prompted to enter a username at the login screen. Authentication module 208 may receive the username entered on user device 102. Authentication module 208 may then search data storage 120 for a user profile having a username matching the received username. If no matching username is found, authentication module 208 may display an error message to the user informing him of this. If a matching username is found, authentication module 208 may retrieve the one or more images associated with the user profile and provide the one or more images for display on the user interface of user device 102, along with a number of other random images. The other random images may be from the same or a different theme as the images comprising the user's visual password. For example, if the user password is made of four images from the "cat" theme, authentication module 208 may provide 26 random images from the cat theme, along with the four password images, for display on user device 102. The one or more images may be displayed for the user by a web page accessible on user device 102.

The images may be displayed on user device 102 in a similar manner to the way images were displayed for the user during the password creation process described above. For example, if the user's visual password comprises four images, those four images may be displayed within a grid of 30 images on the screen of user device 102. The four password images may be randomly arranged within the grid. The four password images may be displayed in the same order that they were displayed when the user first created the visual password. In other embodiments, the images may be displayed on a scroll wheel on the screen of user device 102.

The user may be prompted to enter his visual password. The user may then select the required number of images in a certain order. The user may select the images using the same mechanism he or she used to select the images when the password was created (as described above). If the user's visual password comprises four images, the user may be prompted to select four images. Once the user has selected four images from the displayed images, password conversion module 206 and/or authentication module 208 may construct a password string based on the alphanumeric characters and/or symbols associated with the four selected images. Authentication module 208 may then compare the constructed password string with the password string associated with the user's profile or account in database 120. Authentication module 208 may add the same randomly generated characters to the constructed password string as the ones included in the password string associated with the user profile. In other embodiments, authentication module 208 may compare the four selected images with the four images associated with the user's profile in data storage 120.

If the passwords match (or the images and image order matches), authentication module 208 will authenticate the user and allow the user to access his or her account with service provider 112. If the passwords do not match, authentication module 208 may inform the user that he or she entered an incorrect password. Authentication module 208 may prompt the user to re-enter his or her password. Authentication module 208 may provide a new grid of pictures that includes the one or more images from the user's profile. The new grid may be arranged differently from the previous grid. In other embodiments, visual password system 110 may be used to control access to multiple accounts with multiple entities under a single visual password associated with a user holding the multiple accounts.

Authentication module 208 may allow the user a limited number of attempts to enter the correct images in the correct order. The order, number, and arrangement of displayed images may be changed or re-arranged based on the number of times the user attempts to enter the visual password. If the user fails to enter the correct visual password within the allotted number of attempts, authentication module 208 may lockout the user for a certain period of time and prevent that user from logging in during that time. The allotted number of attempts may depend on the number of images displayed to the user. The allotted number of attempts may depend on the length of the user's password. For example, a user with a password comprising five images may be given more attempts to enter the correct password than a user having a password comprising three images. Authentication module 208 may alert service provider 112 of the failed login attempts. Service provider 112 may have contact information associated with the user account and may send one or more notifications to the user, alerting him or her of the failed attempts. Authentication module 208 may provide the user with the option of retrieving his or her visual password by answering a security question associated with the user's profile and/or username.

Password update module 210 may be configured to update or change the unique set of alphanumeric characters and/or symbols associated with each of the images within each theme. In order to maintain a certain level of password security, service provider 112 and/or visual password system 110 may regularly change the unique set of alphanumeric characters and/or symbols associated with each of the images within each theme. The images and/or themes may remain the same. In one embodiment, the set of characters and symbols associated with each image may be updated every 90 days (or other time period). In other embodiments, the update may occur every year. In other embodiments, the update may be done in stages. For example, the set of characters and/or symbols associated with 25% of the images may be updated every 3 months, so that in one year, for each image, all of the unique characters and/or symbols associated with that image will have been updated.

The frequency of the update may depend on an image's or a theme's popularity. For example, if certain images are more popular than others (i.e., those images are frequently used in visual passwords when compared to other images), the sets of characters and/or symbols associated with the more popular images may be updated more frequently than the sets of characters and/or symbols associated with less popular images.

When the characters and symbols associated with an image are updated, any user profile with a visual password that incorporates that image will also be updated (e.g., by updating the portion of the password string corresponding to that image). Data storage 120 may maintain a record of which images are associated with which user accounts or user profiles. Thus, when a set of characters associated with one or more images are updated, password update module 210 may retrieve the password string for each user profile that used that image as part of his or her visual password. Password update module 210 may remove the old set of characters corresponding to that image from the password string and replace them with the updated set of characters. The updated set of characters for that image may include more or fewer characters than the old set. In this way, the password string for each user may be updated periodically without the user needing to change the password themselves. For example, the grid of characters shown in FIGS. 4a and 4b (that correspond to the grid of images shown in FIG. 3b) may be updated on a regular basis.

Figure 5:
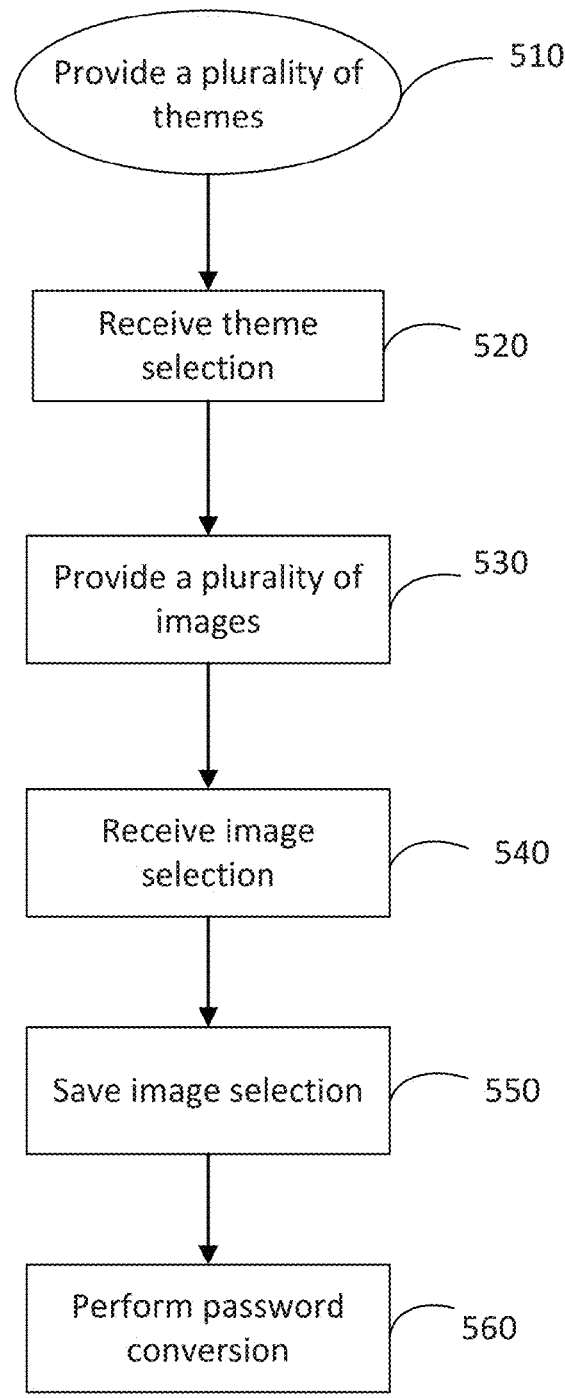
FIG. 5 is a block diagram of a method of a particular embodiment.

FIG. 5 is a flowchart illustrating the functionality of a method for creating a visual password. This method is provided by way of example, as there are a variety of ways to carry out the methods described herein. Method 500 shown in FIG. 5 may be executed or otherwise performed by one or a combination of various systems. The method 500 may be carried out through system 100 of FIG. 1 and/or the one or more modules shown in FIG. 2, by way of example, and various elements of FIG. 1 and FIG. 2 are referenced in explaining method 500 of FIG. 5. Each block shown in FIG. 5 represents one or more processes, methods, or subroutines carried out in method 500. Method 500 may begin at block 510.

At block 510, method 500 may provide a plurality of themes for display on a user device. Each theme may comprise an image displayed on a user device. The plurality of themes may be displayed on an interactive web page accessed by the user. The plurality of themes may be displayed to the user via a local application on the user device. Each theme may be associated with a category of images and represent that category. Method 500 may proceed to block 520.

At block 520, method 500 may receive a theme selection from the user. The theme selection may be received via a network, such as network 108. The theme selection may be received from a user device, such as user device 102. The user may select a theme using a key on a keypad (e.g., depress a key, scroll a wheel, etc.), clicking on the image displayed on the screen using a mouse or other peripheral device connected to the user device, pressing a button on the side of the user device, by touching a theme on a touchscreen of the user device, by speaking a selection, by use a motion (e.g., the user device may include a gyroscope or other motion detector to detect when the user moves the device a certain angle, or shakes, swings, maneuvers, and/or otherwise moves the calling device, etc.), or other manners of selecting between the different themes. In some embodiments, the user may provide their own theme (for instance, by uploading one or more images from their user device or by providing a URL to a website that stores or displays images). Method 500 may proceed to block 530.

At block 530, method 500 may provide a plurality of images for display on the user device, based on the selected theme. Each image in the plurality of images may be associated with the category represented by the selected theme. For instance, if the selected theme was "NBA Basketball Teams," then each image within the plurality of images for that theme would depict a visual associated with an NBA basketball team. The images may be displayed to the user in the same way or in a similar way that the plurality of themes was displayed to the user. Each of the plurality of images may be selectable by the user. The user may be prompted to select one or more images to create a visual password. Method 500 may proceed to block 540.

At block 540, method 500 may receive one or more image selections from the user. The image selections may be received via a network, such as network 108. The image selections may be received from a user device, such as user device 102. The user may select an image using a key on a keypad (e.g., depress a key, scroll a wheel, etc.), clicking on the image displayed on the screen using a mouse or other peripheral device connected to the user device, pressing a button on the side of the user device, by touching the image on a touchscreen of the user device, by speaking a selection, by use a motion (e.g., the user device may include a gyroscope or other motion detector to detect when the user moves the device a certain angle, or shakes, swings, maneuvers, and/or otherwise moves the calling device, etc.), or other manners of selecting between the different images. Method 500 may require the user to select a minimum number of images. Method 500 may include a limitation on the total number of images the user may select. In some embodiments, the user may provide their own images (for instance, by uploading one or more images from their user device or by providing a URL to a website that stores or displays images). Method 500 may proceed to block 550.

At block 550, method 500 may save the one or more image selections. Method 500 may save the image selections in the order they were selected by the user. Method 500 may associate the received images with a user profile or user account with a service provider. Method 500 may proceed to block 560.

At block 560, method 500 may perform a password conversion based on the received images. Each image may be associated with a unique string of alphanumeric characters and/or symbols. Method 500 may determine the string of unique characters associated with each image and create a password string based on the images and the order in which they were selected by the user. The password string may comprise a plurality of characters and symbols. The password string may be saved or associated with the user profile or account information. In some embodiments, method 500 may generate a string of random numbers and append it to the password string. In some embodiments, method 500 may update or periodically change the unique characters associated with each image within each theme.

Figure 6:
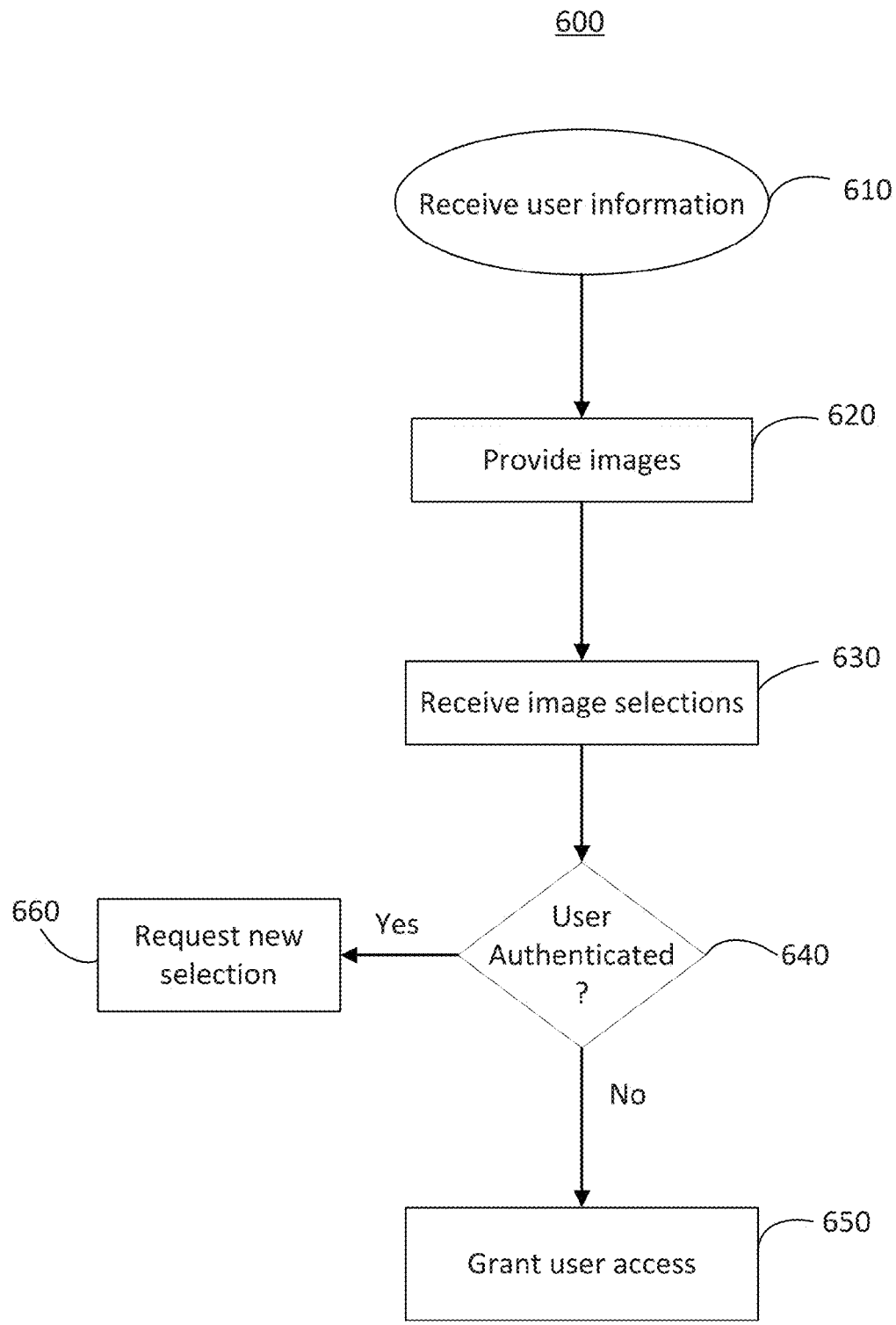
FIG. 6 is a block diagram of a method of a particular embodiment.

FIG. 6 is a flowchart illustrating the functionality of a method for authenticating a visual password. This method is provided by way of example, as there are a variety of ways to carry out the methods described herein. Method 600 shown in FIG. 6 may be executed or otherwise performed by one or a combination of various systems. The method 600 may be carried out through system 100 of FIG. 1 and/or the one or more modules shown in FIG. 2, by way of example, and various elements of FIG. 1 and FIG. 2 are referenced in explaining method 600 of FIG. 6. Each block shown in FIG. 6 represents one or more processes, methods, or subroutines carried out in method 600. Method 600 may begin at block 610.

At block 610, method 600 may receive user login information. The login information may be received via a network, such as network 108. The login information may be received from a user device, such as user device 102. The login information may comprise information that uniquely identifies an account holder having an account or profile with a service provider. The login information may comprise a user name, a phone number, an email address, physical address, first and/or last name, an SSN, credit card number, account number, PIN, text-based password, or other unique information. Method 600 may proceed to block 620.

At block 620, method 600 may retrieve and provide a plurality of images for display to the user on user device 102. Method 600 may retrieve the images from data storage 120, based on the login information provided in block 610. The images may have been previously stored in data storage and associated with the user's account using the process described in FIG. 5. Method 600 may match the received login information with information associated with a user account in data storage 120 and retrieve the images stored in that account. Method 600 may provide the one or more images, along with one or more random images from within the same theme (or different themes) for display on the user device. The images may be displayed as a grid, in a random array, as a scroll wheel of images, or in other known methods of displaying content for a user. Method 600 may proceed to block 630.

At block 630, method 600 may receive the one or more image selections from the user. The image selections may be received via a network, such as network 108. The image selections may be received from a user device, such as user device 102. The user may select an image using a key on a keypad (e.g., depress a key, scroll a wheel, etc.), clicking on the image displayed on the screen using a mouse or other peripheral device connected to the user device, pressing a button on the side of the user device, by touching the image on a touchscreen of the user device, by speaking a selection, by use a motion (e.g., the user device may include a gyroscope or other motion detector to detect when the user moves the device a certain angle, or shakes, swings, maneuvers, and/or otherwise moves the calling device, etc.), or other manners of selecting between the different images. Method 600 may proceed to block 640.

At block 640, method 600 may authenticate the user. Method 600 may retrieve the strings associated with each selected image (similar to the process described in block 560 of FIG. 5) and create a password string by combining the retrieved strings in the order in which the images were selected by the user in block 630. Method 600 may compare the password string with the password string associated with the user profile determined in block 610. If the strings match, method 600 may proceed to block 650. If the strings do not match, method 600 may display one or more error messages to the user on user device 102, and request the user to re-enter his or her visual password (as in block 660). If the user is authenticated, as in block 650, the user may be allowed to access his or her account or profile. In block 660, the user may be given a limited number of attempts to re-enter the correct visual password. If the user fails to enter the correct visual password within the required number of attempts, the user may be blocked from accessing his or her account for a predefined period of time. The system may contact the user to verify his or her password. The system may give the user the option of changing or updating his or her visual password. This process may be similar to the process described in FIG. 5. The system may give the user the option of retrieving his or her user password. The system may require the user to answer one or more security questions before allowing the user to update his or her password, or retrieve his or her password.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++. Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, such as the data storage 120, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a." "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer-based system, comprising:
 a theme module to provide one or more themes for display on a user device and receive a selection of at least one of the one or more themes from the user device, wherein the theme module provides the one or more themes based on at least one of account information associated with a user of the user device, data uploaded from the user device, a current location of the user device, the current date, and the current time;
 an image module to provide one or more images for display on the user device based on the selected theme and receive a first selection of at least one of the one or more images from the user device;
 a conversion module to store the at least one selected image, associate the at least one selected image with a user account, and construct a first password string based on the at least one selected image; and
 an authentication module to:
  receive user information from the user device,
  provide a plurality of images for display on the user device, wherein at least one of the plurality of images includes the at least one selected image associated with the user profile,
  receive a second selection of at least one of the plurality of images,
  compare the received second selection with the at least one stored image, and
  grant the user device access to the user account if the received second selection matches the at least one stored image.

2. The system of claim 1, wherein each image of the at least one selected image is associated with a unique string of at least one of alphanumeric characters and symbols, wherein the conversion module constructs the first password string using the unique string associated with each image of the at least one selected image.

3. The system of claim 2, wherein, if the first selection comprises a plurality of images, the order of the unique strings in the first password string is based on the order in which each image in the plurality of images was selected.

4. The system of claim 2, further comprising a password update module to replace the unique string associated with each of the at least one selected image with an updated unique string without altering each of the at least one selected image.

5. The system of claim 2, wherein the conversion module adds at least one string of one or more randomly generated characters to the first password string.

6. The system of claim 5, wherein the length of the at least one string depends on the length of the first password string.

7. The system of claim 1, wherein the authentication module constructs a second password string based on the received second selection of one or more images and compares the second password string to the stored first password string, wherein the authentication module denies the user device access to the user account if the second password string does not match the first password string.

8. The system of claim 1, wherein the image module provides the one or more images based on at least one of account information associated with a user of the user device, data uploaded from the user device, a current location of the user device, the current date, and the current time.

9. A method, comprising:
 providing one or more themes to display on a user device, wherein the one or more themes are provided based on at least one of account information associated with a user of the user device, data uploaded from the user device, a current location of the user device, the current date, and the current time;
 receiving a selection of at least one of the one or more themes from the user device;
 providing a plurality of images to display on the user device based on the received selection of at least one of the one or more themes;
 receiving a selection of at least one of the plurality of images from the user device;
 saving the selected one or more images and associating the selected one or more images with a user account; and
 determining a password based on the selected one or more images.

10. The method of claim 9, wherein each image of the at least one selected image is associated with a unique string of at least one of alphanumeric characters and symbols, wherein determining the password comprises constructing a first password string using the unique string associated with each image of the at least one selected image.

11. The method of claim 10, wherein, if a plurality of images were selected, the order of the unique strings in the first password string is based on the order in which each image in the plurality of images was selected.

12. The method of claim 10, further comprising replacing the unique string associated with each of the at least one selected image with an updated unique string without altering each image of the at least one selected image.

13. The method of claim 10, further comprising adding at least one string of one or more randomly generated characters to the first password string.

14. The method of claim 13, wherein the length of the at least one string depends on the length of the first password string.

15. The method of claim 10, further comprising saving the first password string and associating the password string with the user profile.

16. The method of claim 9, wherein the one or more images are provided based on at least one of account information associated with a user of the user device, data uploaded from the user device, a current location of the user device, the current date, and the current time.

17. The method of claim 9, further comprising:
 receiving user information from a user device,
 matching the user information to a user account, wherein the user account is associated with one or more password images,
 providing a plurality of images for display on the user device, wherein at least one of the plurality of images is the one or more password images,
 receiving a selection of at least one of the plurality of images from the user device,
 comparing the received plurality of images with the one or more password images, and
 granting the user device access to the user account if the received selection matches the one or more password images.

18. The method of claim 17, wherein each of the one or more password images is associated with a first string of at least one of alphanumeric characters and symbols, wherein comparing the received plurality of images with the one or more password images comprises comparing the first string with a second string of at least one of alphanumeric characters and symbols associated with the received plurality of images.

* * * * *